United States Patent
Koike et al.

(10) Patent No.: US 11,401,984 B2
(45) Date of Patent: *Aug. 2, 2022

(54) TORQUE GENERATING DEVICE

(71) Applicant: Alps Alpine Co., Ltd., Tokyo (JP)

(72) Inventors: Asuka Koike, Miyagi-ken (JP);
Kazunari Takahashi, Miyagi-ken (JP);
Misuzu Takahashi, Miyagi-ken (JP);
Yoshihiro Kuge, Miyagi-ken (JP);
Atsushi Goto, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 227 days.

This patent is subject to a terminal disclaimer.

(21) Appl. No.: 16/748,456

(22) Filed: Jan. 21, 2020

(65) Prior Publication Data

US 2020/0158191 A1 May 21, 2020

Related U.S. Application Data

(63) Continuation of application No. PCT/JP2018/025917, filed on Jul. 9, 2018.

(30) Foreign Application Priority Data

Aug. 3, 2017 (JP) .............................. JP2017-150400

(51) Int. Cl.
  *F16D 37/00* (2006.01)
  *F16D 57/00* (2006.01)

(52) U.S. Cl.
  CPC ......... *F16D 37/008* (2013.01); *F16D 57/002* (2013.01); *F16D 2037/004* (2013.01); *F16D 2037/005* (2013.01)

(58) Field of Classification Search
  CPC ................. F16D 57/002; F16D 37/008; F16D 2037/002; F16D 2037/004; F16D 2037/005; F16D 2037/007; F16F 9/535; G05G 5/03
  See application file for complete search history.

(56) References Cited

U.S. PATENT DOCUMENTS

| 2,738,044 A | 3/1956 | Winther |
| 6,527,661 B2 | 3/2003 | Leeper |

(Continued)

FOREIGN PATENT DOCUMENTS

| JP | S62-55743 | 4/1987 |
| JP | 2002 039246 A | 2/2002 |

(Continued)

OTHER PUBLICATIONS

Supplemental European Search Report from corresponding European application No. EP 1884 1149.0, 9pp., dated Feb. 2, 2021.

*Primary Examiner* — Richard M Lorence

(74) *Attorney, Agent, or Firm* — Crowell & Moring LLP

(57) ABSTRACT

A torque generating device includes a magnetic disk configured to rotate around a rotation axis, first and second yokes located on opposite sides across the magnetic disk, a coil disposed to overlap the magnetic disk along a direction of the rotation axis, a third yoke of which at least a region proximity to the magnetic disk is located outside the magnetic disk and the coil and that makes up a magnetic path of a magnetic field generated by the coil with the first and second yokes, and a magnetic viscous fluid filled between the magnetic disk and the first and second yokes. The third yoke has a magnetic gap between the third and first yokes. The magnetic gap is formed at a position outside an outer peripheral edge of the magnetic disk or overlapping the outer peripheral edge of the magnetic disk along the direction of the rotation axis.

15 Claims, 12 Drawing Sheets

(56) References Cited

U.S. PATENT DOCUMENTS

| | | | |
|---|---|---|---|
| 2003/0079948 A1 | 5/2003 | Jolly et al. | |
| 2014/0085765 A1* | 3/2014 | Gurocak | F16F 9/53 361/152 |
| 2018/0090289 A1* | 3/2018 | Wakuda | H01H 36/008 |
| 2019/0257372 A1* | 8/2019 | Plante | F16D 27/12 |
| 2021/0079966 A1* | 3/2021 | Koike | F16D 63/002 |

FOREIGN PATENT DOCUMENTS

| | | |
|---|---|---|
| JP | 2005-507061 | 3/2005 |
| JP | 2005-90663 | 4/2005 |
| JP | 2011 247403 A | 12/2011 |
| JP | 2016-017896 | 2/2016 |
| JP | 2017-116014 | 6/2017 |
| WO | WO 2016/208455 A1 | 12/2016 |
| WO | WO 2017/060330 A1 | 4/2017 |

\* cited by examiner

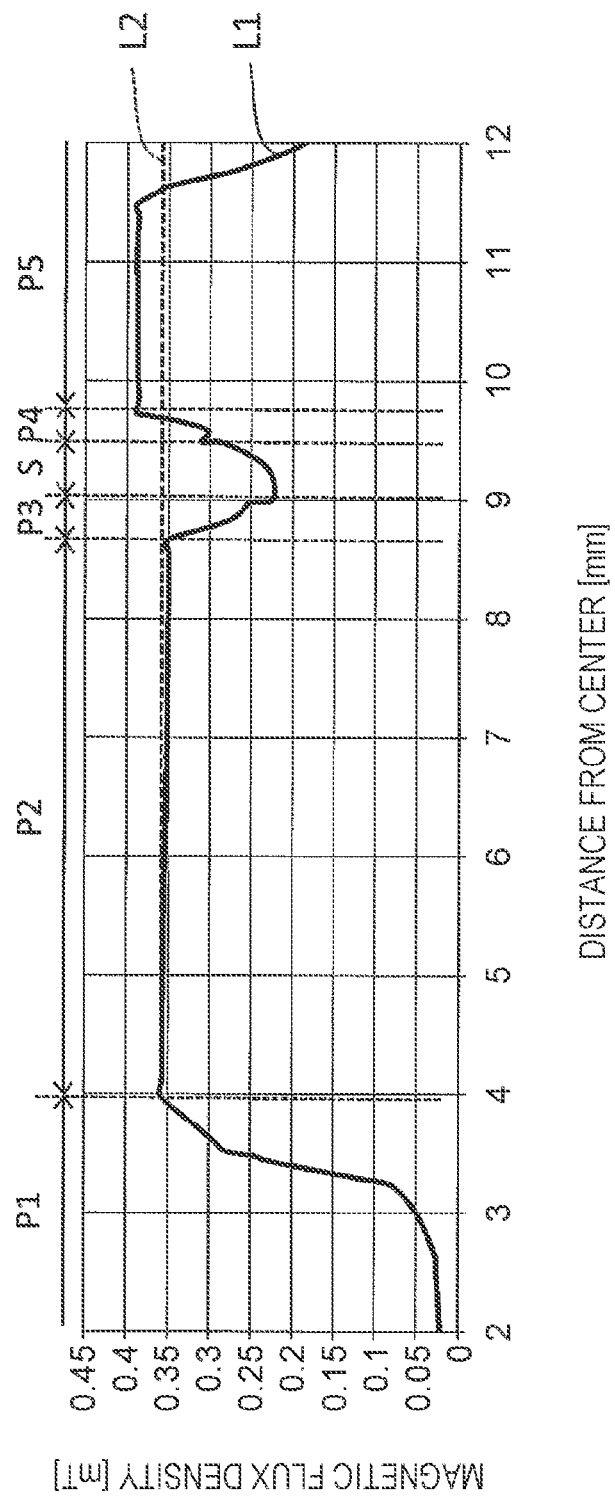

TORQUE GENERATING DEVICE

CLAIM OF PRIORITY

This application is a Continuation of International Application No. PCT/JP2018/025917 filed on Jul. 9, 2018, which claims benefit of priority to Japanese Patent Application No. 2017-150400 filed on Aug. 3, 2017. The entire contents of each application noted above are hereby incorporated by reference.

BACKGROUND

1. Field of the Disclosure

The present disclosure relates to a torque generating device that is able to change rotational resistance by using a magnetic viscous fluid.

2. Description of the Related Art

A brake described in Japanese Patent No. 4695835 includes a housing, a rotor connected to a rotatable shaft, a magnetism generating means (magnetic field generator) placed in a first housing chamber of the housing, a magnetic field response material (magnetic viscous fluid), and a means for controlling or monitoring an operation of the brake. The magnetic field generator includes a coil and a pole piece, and the coil causes the pole piece, disposed to face the rotor, to generate a magnetic field.

However, the magnetic field is applied to the brake described in Japanese Patent No. 4695835 only near the outer peripheral portion of the rotor, so braking force to be generated has not been enough. For this reason, it has been difficult to obtain large shear stress while achieving further miniaturization.

SUMMARY

The present disclosure provides a torque generating device that uses a magnetic viscous fluid and that is suitable for miniaturization and able to obtain large shear stress.

A torque generating device according to an embodiment of the present invention includes a magnetic disk configured to have rotational motion around a rotation axis, a first yoke located on one side and a second yoke located on an other side across the magnetic disk, a coil disposed so as to overlap the magnetic disk when viewed in a direction along a direction in which the rotation axis extends, a third yoke of which at least a region proximity to the magnetic disk is located on an outer side of the magnetic disk and the coil and that makes up a magnetic path of a magnetic field that is generated by the coil in cooperation with the first yoke and the second yoke, and a magnetic viscous fluid filled between the magnetic disk and each of the first yoke and the second yoke.

The third yoke has a magnetic gap between the third yoke and the first yoke. The magnetic gap is formed at a position on an outer side of an outer peripheral edge of the magnetic disk or a position that overlaps the outer peripheral edge of the magnetic disk when viewed in the direction along the direction in which the rotation axis extends.

With this configuration, magnetic flux having a magnetic field component that crosses between the first yoke and the second yoke as a main direction can be passed in a wide range except the outer peripheral edge of the magnetic disk, and a resistance force (torque) can be generated in a direction based on the direction of the magnetic flux, so large shear stress can be obtained without an increase in the size of the device.

BRIEF DESCRIPTION OF THE DRAWINGS

FIG. 4B is a view that conceptually shows a magnetic field generated by an exciting coil;

FIG. 5B is a view that conceptually shows a magnetic field generated by the exciting coil;

FIG. 9 is a graph that shows the distribution of magnetic flux density in the magnetic disk of the first embodiment shown in FIG. 8A and the distribution of magnetic flux density in the magnetic disk of the comparative example shown in FIG. 8B;

DESCRIPTION OF THE EXEMPLARY EMBODIMENTS

Hereinafter, a torque generating device according to embodiments of the present invention will be described in detail with reference to the drawings.

Figure 1A:
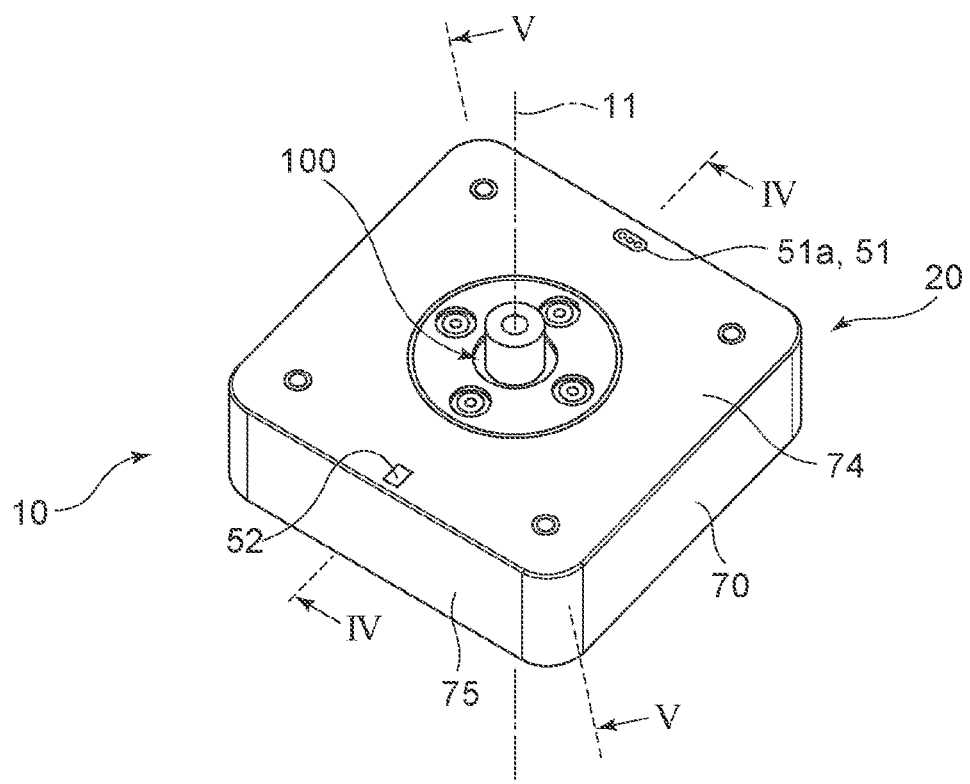
FIG. 1A is a perspective view when a torque generating device according to a first embodiment is viewed from a top side.
Figure 1B:
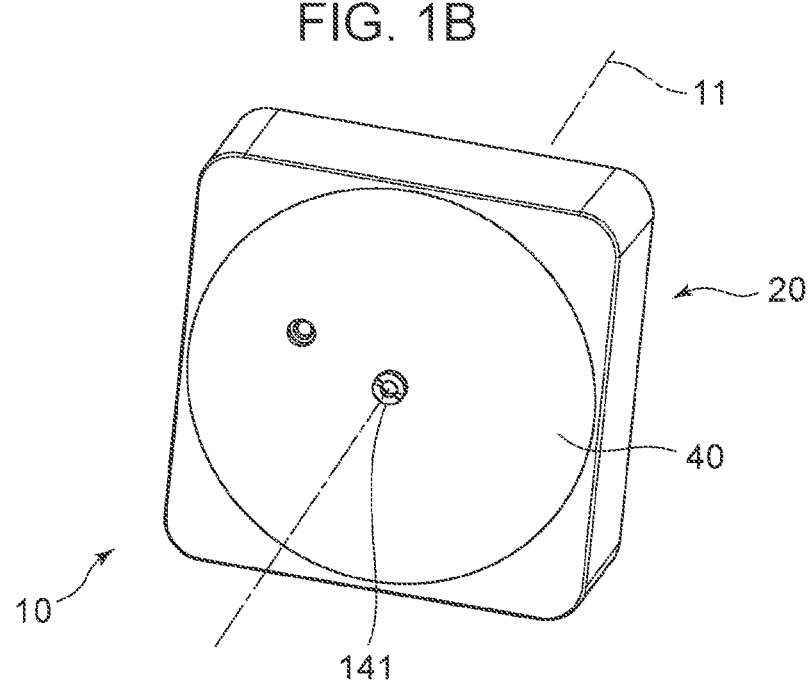
FIG. 1B is a perspective view when the torque generating device of FIG. 1A is viewed from a bottom side.
Figure 2:
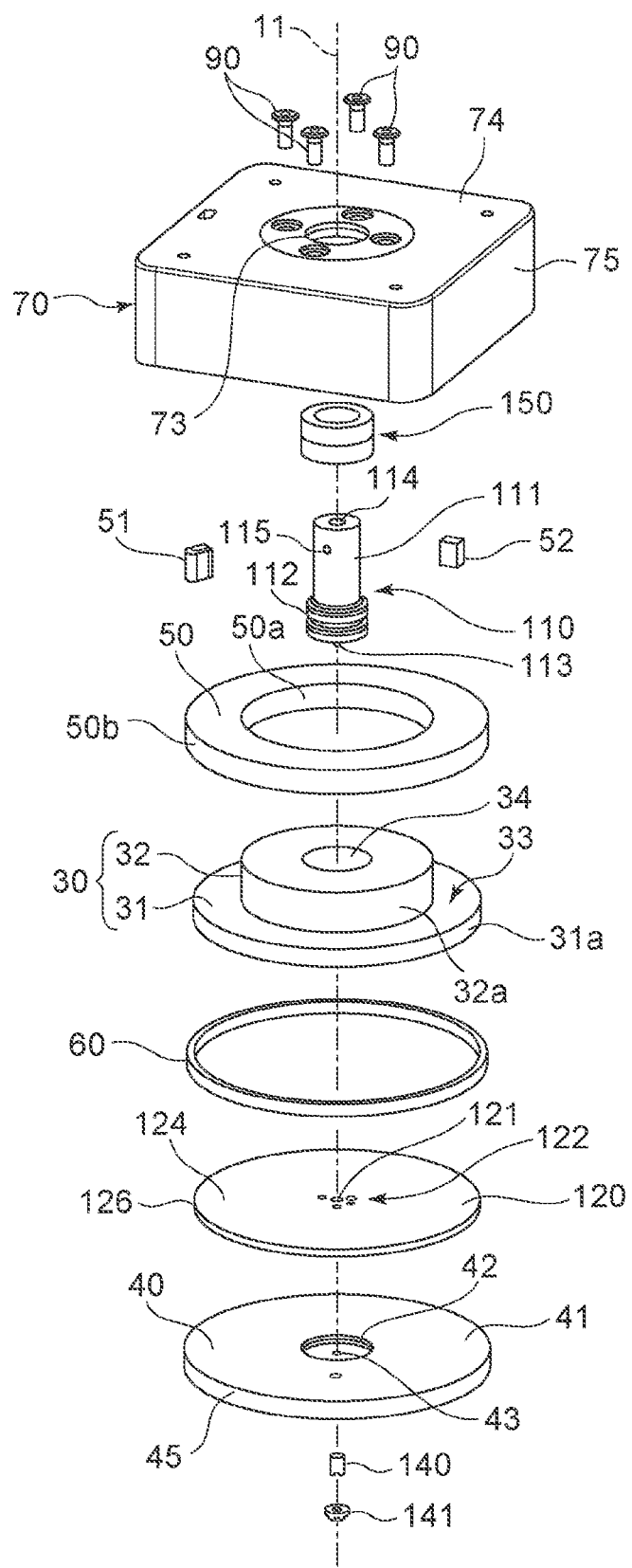
FIG. 2 is an exploded perspective view when the torque generating device according to the first embodiment is viewed from the top side.
Figure 3:
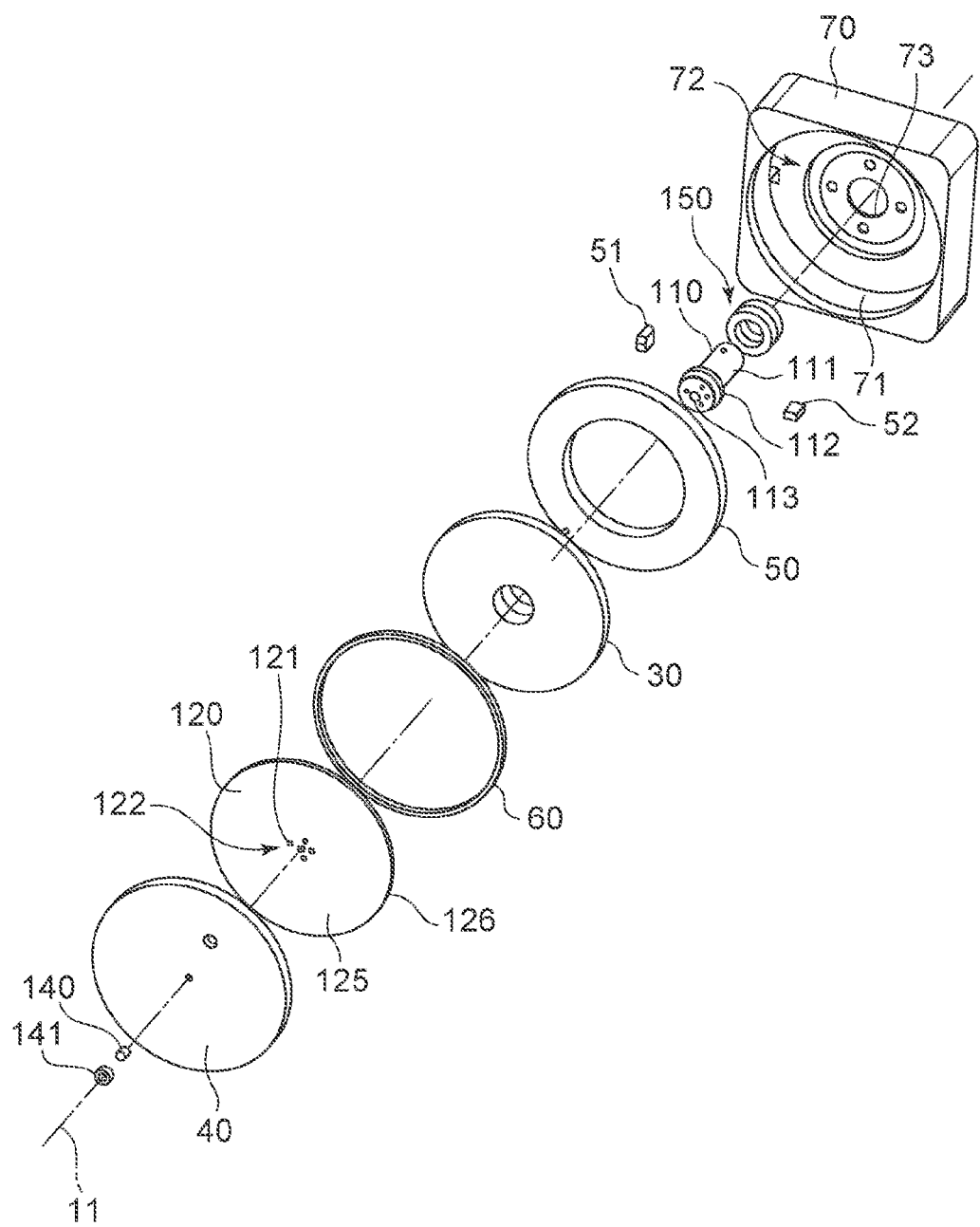
FIG. 3 is an exploded perspective view when the torque generating device according to the first embodiment is viewed from the bottom side.

FIG. 1A is a perspective view when the torque generating device 10 according to a first embodiment is viewed from a top side, and FIG. 1B is a perspective view when the torque generating device 10 is viewed from a bottom side. FIG. 2 and FIG. 3 are exploded perspective views of the torque generating device 10. FIG. 2 is an exploded perspective view when viewed from the top side. FIG. 3 is an exploded perspective view when viewed from the bottom side. FIG.

Figure 4A:
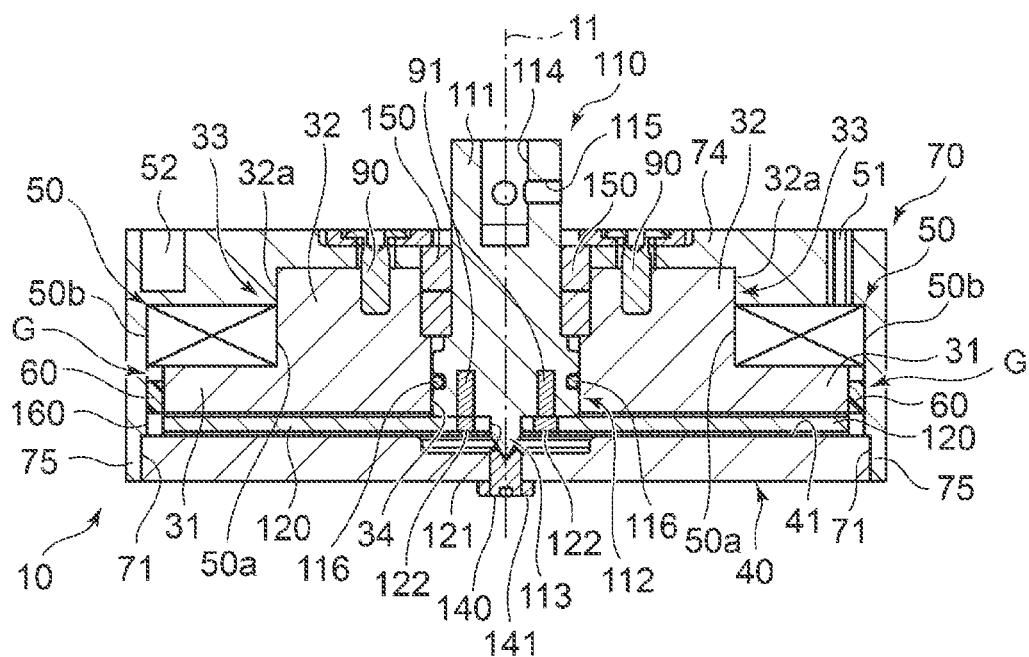
FIG. 4A and FIG. 4B are cross-sectional views taken along the line IV-IV in FIG. 1A.
Figure 4B:
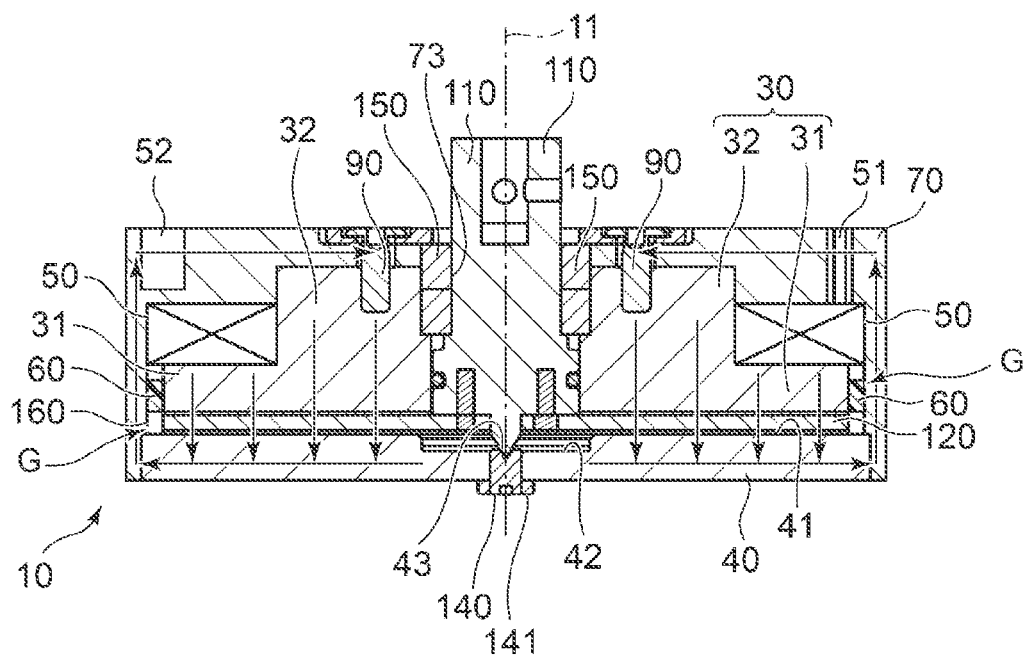
Figure 5A:
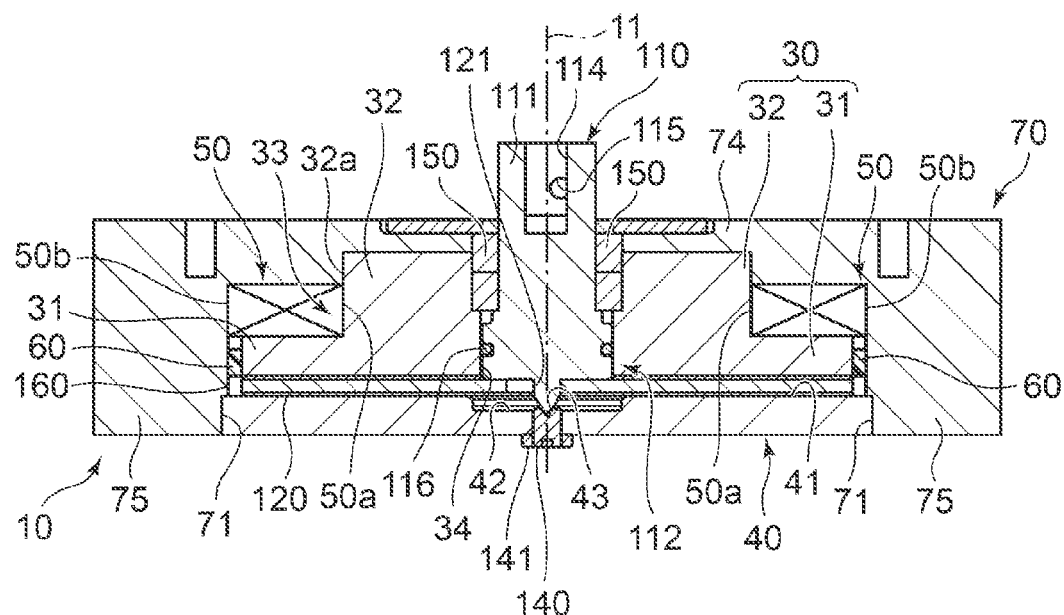
FIG. 5A and FIG. 5B are cross-sectional views taken along the line V-V in FIG. 1A.
Figure 5B:
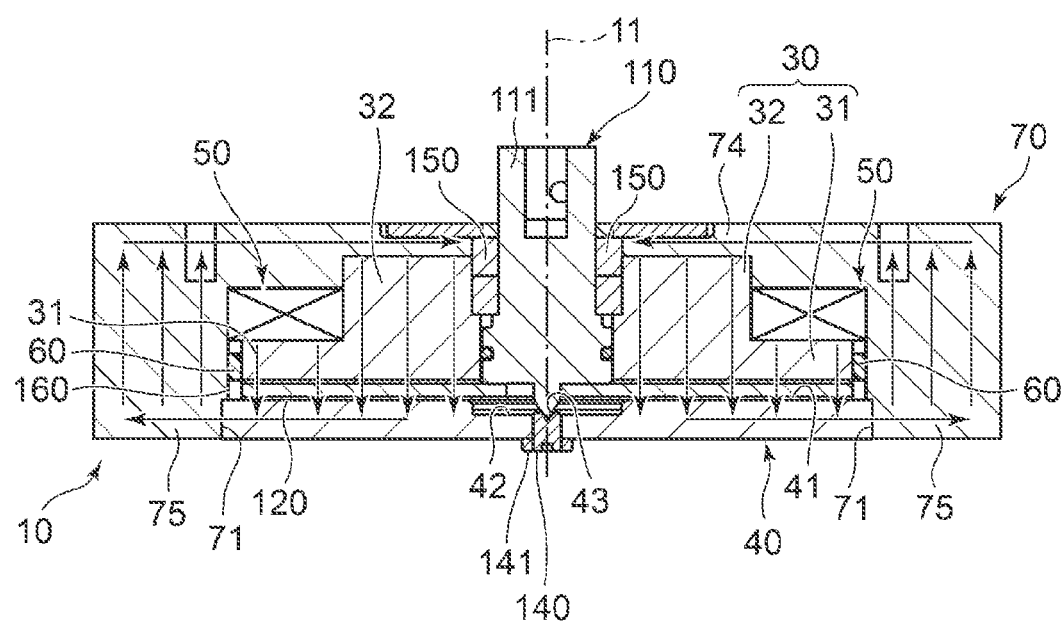
Figure 6:
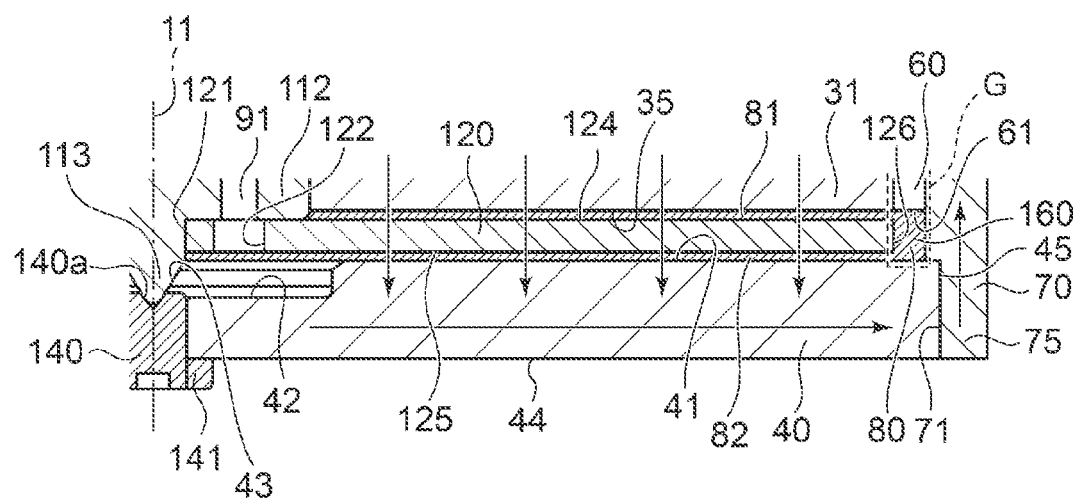
FIG. 6 is a partially enlarged view of FIG. 4A.

4A and FIG. 4B are cross-sectional views taken along the line IV-IV' in FIG. 1A, and FIG. 4B is a view that conceptually illustrates a magnetic field generated by an exciting coil 50. FIG. 5A and FIG. 5B are cross-sectional views taken along the line V-V' in FIG. 1A, and FIG. 5B is a view that conceptually shows a magnetic field generated by the exciting coil. FIG. 6 is a partially enlarged view of FIG. 4A. In FIG. 1A to FIG. 6, for the sake of convenience of illustration, an up-down direction is defined along a central axis 11; however, this does not limit directions during actual use. A direction perpendicular to the central axis 11 from the central axis 11 is referred to as radial direction. In the following description, a state when viewed downward from above along the central axis 11 can be referred to as plan view. In FIG. 2 and FIG. 3, part of screws and a magnetic viscous fluid are not shown.

As shown in FIG. 1A and FIG. 1B, a torque generating device 10 includes a holder 20, a Hall element 52 that serves as a magnetic measurement portion or sensor, and an operating unit 100. The operating unit 100 includes a shaft 110 and a magnetic disk 120. The shaft 110 and the magnetic disk 120 are combined with each other and are supported by the holder 20 so as to rotate in two directions around the central axis 11 (rotation axis). The operating unit 100 is supported by the holder 20 in a rotatable state via a support member 140 and a radial bearing 150 (FIG. 2). As shown in FIG. 4A to FIG. 6, a clearance 80 provided inside the torque generating device 10 is filled with the magnetic viscous fluid 160.

The holder 20 includes a first yoke 30, a second yoke 40, an exciting coil 50 that serves as a magnetic field generating portion, an annular member 60, and a third yoke 70 that serves as a top case. As shown in FIG. 2, the first yoke 30 and the second yoke 40 are combined such that the first yoke 30 is located on one side of the magnetic disk 120 and the second yoke 40 is located on the other side of the magnetic disk 120. Preferably, the first yoke 30, the second yoke 40, and the third yoke 70 each are separately worked into a shape. However, some of the first yoke 30, the second yoke 40, and the third yoke 70 may be integrally formed in combination.

As shown in FIG. 2, the first yoke 30 includes an annular portion 31 and a cylindrical portion 32 integrally provided so as to extend upward from the top surface of the annular portion 31 concentrically with the annular portion 31. The annular portion 31 and the cylindrical portion 32 each have a circular shape about the central axis 11 in plan view. The outside diameter of the cylindrical portion 32 is less than the outside diameter of the annular portion 31. Because of the difference in outside diameter between the annular portion 31 and the cylindrical portion 32, a step portion 33 is formed on the outer side of an outer periphery 32a of the cylindrical portion 32. The first yoke 30 has a circular inner periphery 34 in plan view around the central axis 11. The inner periphery 34 extends through the annular portion 31 and the cylindrical portion 32 along the central axis 11. The inside diameter of the inner periphery 34 is set so as to vary with a position in the up-down direction.

As shown in FIG. 4A, the exciting coil 50 that serves as a magnetic field generating portion is disposed at the step portion 33 of the first yoke 30. In the exciting coil 50, an inner periphery 50a has an annular shape that is formed along the outer periphery 32a of the cylindrical portion 32, and an outer periphery 50b is located outside an outer periphery 31a of the annular portion 31 in the radial direction. The exciting coil 50 is a coil including a conductor wound around the central axis 11. A connection member 51 is electrically connected to the exciting coil 50. Current is supplied through a path (not shown) to an input portion 51a of the connection member 51, exposed from the top portion of the third yoke 70. As current is supplied to the exciting coil 50, a magnetic field is generated.

The annular member 60 is fixed to the annular portion 31 of the first yoke 30 along the outer periphery 31a. The annular member 60 has an annular shape and is made of a non-magnetic material, such as a synthetic resin. The annular member 60 fixed to the first yoke 30 has an annular shape having substantially the same outside diameter as the exciting coil 50 disposed at the step portion 33 in plan view. As shown in FIG. 6, an under surface 61 of the annular member 60 forms substantially the same plane as a bottom surface 35 of the first yoke 30, and this plane extends along a direction perpendicular to the central axis 11. The thickness of the annular member 60 in the radial direction is such a thickness that the magnetic field generated by the exciting coil 50 can be prevented from penetrating through the annular member 60 in the radial direction. The thickness of the annular member 60 in the radial direction may be varied between an upper side and a lower side.

As shown in FIG. 2, the second yoke 40 has a disc shape and is disposed below the first yoke 30. The second yoke 40 has a top surface 41 perpendicular to the up-down direction along the central axis 11. An annular groove 42 that opens upward around the central axis 11 is provided on the top surface 41. A hole 43 extending through the second yoke 40 in the up-down direction is formed at the center of the groove 42. As shown in FIG. 6, a support member (pivot support member) 140 extending in the up-down direction is inserted in the hole 43, and the support member 140 is fixed to the second yoke 40 by a retainer 141 fixed to an under surface 44 of the second yoke 40. The support member 140 has a bearing portion 140a that serves as a recess open upward, and receives a distal end portion of the shaft 110 with the bearing portion 140a such that the shaft 110 is rotatable.

The planar shape of each of the yokes 30, 40 is not necessarily a circular shape. Splitting of a yoke does not need to be a combination of the first yoke 30 and the second yoke 40 as in the case of the first embodiment, and rectangular planar shapes may be employed depending on a split position.

As shown in FIG. 6, both the bottom surface 35 of the first yoke 30 and the under surface 61 of the annular member 60 and the top surface 41 of the second yoke 40 are substantially parallel to each other, and the clearance 80 is formed between the bottom surface 35 and the top surface 41.

As shown in FIG. 3, the third yoke 70 has a space 72 that accommodates (1) the exciting coil 50, the first yoke 30, and the annular member 60, (2) the connection member 51 and the Hall element 52, and (3) the radial bearing 150, the shaft 110, and the magnetic disk 120 inside. The space 72 is formed in a circular shape in plan view by the inner periphery 71. The lower side of the space 72 is closed by disposing the second yoke 40. The space 72 is surrounded by a top wall portion 74 and side wall portion 75 of the third yoke 70. As shown in FIG. 1A and FIG. 1B, preferably, the third yoke 70 has a substantially rectangular shape in plan view, while the space 72 has a circular shape in plan view as described above. Therefore, the shape of the side wall portion 75 in plan view is thick at the corners of the third yoke 70 and thin at the sides of the third yoke 70.

The second yoke 40 is fixed to the third yoke 70 by screws (not shown) extending through the side wall portion 75 of the third yoke 70 in the radial direction. Thus, the second yoke 40 is fixed in a state where an outer periphery 45 of the second yoke 40 is in contact with the side wall portion 75 of the third yoke 70, and the second yoke 40 and the third yoke 70 are magnetically connected to each other.

With the use of the first yoke 30, the second yoke 40, and the third yoke 70, a magnetic path (magnetic circuit) that causes a magnetic field generated by the exciting coil 50 to form a closed loop can be formed.

As shown in FIG. 4A and FIG. 4B, the third yoke 70 and the first yoke 30 are fixed to each other by a plurality of screws 90 extending through the top wall portion 74 of the third yoke 70 upward and downward. Thus, the first yoke 30 and the third yoke 70 are fixed in a state where the top portion of the first yoke 30 and the top wall portion 74 of the third yoke 70 are in contact with each other. In this region, the first yoke 30 and the third yoke 70 are magnetically connected.

On the other hand, the annular member 60 made of a non-magnetic material is fixed to the outer periphery 31a of the annular portion 31 of the first yoke 30, and the outer periphery of the annular member 60 is in contact with the inner periphery 71 of the third yoke 70. The side wall portion 75 of the third yoke 70 is located on the outer side of the magnetic disk 120 and the exciting coil 50 in a region proximity to the magnetic disk 120. Therefore, the annular portion 31 of the first yoke 30 and the side wall portion 75 of the third yoke 70 are spaced apart from each other by the annular member 60 in the direction perpendicular to the central axis 11, and a magnetic gap G is formed. The magnetic gap G extends from the bottom surface of the exciting coil 50 to the top surface 41 of the second yoke 40 in the direction along the central axis 11. In the radial direction, the magnetic gap G corresponds to the clearance between the inner periphery 71 of the third yoke 70 and the outer periphery 126 of the magnetic disk 120 disposed in the clearance 80 between the first yoke 30 and the second yoke 40. With the magnetic gap G, passage of the magnetic flux of a magnetic field generated by the exciting coil 50 in the direction perpendicular to the central axis 11 from the annular portion 31 of the first yoke 30 to the side wall portion 75 of the third yoke 70 or from the magnetic disk 120 to the side wall portion 75 of the third yoke 70 can be restricted.

In the above configuration, as current is applied to the exciting coil 50, a magnetic field having a flow in a direction schematically represented by the arrows in FIG. 4B is formed. As current is applied to the exciting coil 50 in a reverse direction, a magnetic field having a reverse flow from that of FIG. 4B is formed. In the example shown in FIG. 4B, magnetic flux crosses the magnetic disk 120 from the first yoke 30 toward the second yoke 40 along the direction of the central axis 11, the magnetic flux travels in a direction to go away from the central axis 11 in the second yoke 40, and the magnetic flux travels upward from the lower side along the direction of the central axis 11 in the side wall portion 75 of the third yoke 70. In addition, the magnetic flux travels in a direction to approach the central axis 11 in the top wall portion 74 of the third yoke 70, travels downward from the upper side, that is, toward the cylindrical portion 32 of the first yoke 30, in a region corresponding to the inner side of the exciting coil 50, travels downward on the inner side of the exciting coil 50, and crosses the magnetic disk 120 again to reach the second yoke 40. In a magnetic field of such a magnetic path, because the magnetic gap G is formed, passage of magnetic flux from the annular portion 31 or the magnetic disk 120 to the side wall portion 75 of the third yoke 70 is restricted. In addition, because the second yoke 40 and the side wall portion 75 of the third yoke 70 are magnetically connected, a magnetic path that passes from the second yoke 40 to the side wall portion 75 is ensured. Furthermore, as described above, because the shape of the side wall portion 75 in plan view is thick at the corners of the third yoke 70 and thin at the sides of the third yoke 70, a wide magnetic path can be ensured particularly in the side wall portion 75 corresponding to the corners, and a magnetic field is generated along the magnetic path (see FIG. 5B).

The third yoke 70 has a substantially circular columnar through-hole 73 in a region including the central axis 11. The through-hole 73 extends through the third yoke 70 in the up-down direction. A space in the through-hole 73 communicates in the up-down direction with a space surrounded by the inner periphery 34 of the first yoke 30.

Next, the structure of the operating unit 100 will be described.

As shown in FIG. 2 and FIG. 3, the shaft 110 that serves as an operating shaft is a rod-shaped member extending upward and downward along the central axis 11. The shaft 110 has an upper-side shaft portion 111 and a grooved portion 112 provided on the lower side of the shaft portion 111. The grooved portion 112 has a spiral groove formed around the central axis 11 on the outer periphery. The distal end portion 113 provided at the center of the under surface of the grooved portion 112 has such a shape that tapers downward.

As shown in FIG. 3, the magnetic disk 120 is made of a magnetic material and is a disc-shaped member having a circular plane disposed perpendicularly to the up-down direction. A center hole 121 extending through in the up-down direction is provided at the center of the circular plane of the magnetic disk 120. A plurality of through-holes 122 extending through the magnetic disk 120 from the upper side to the lower side is provided at a position surrounding the center hole 121. The magnetic disk 120 is fixed to the shaft 110 by fitting the shaft portion of each screw 91, inserted in the through-hole 122 from the lower side, into the grooved portion 112 of the shaft 110.

As shown in FIG. 4A and FIG. 4B, in the shaft 110, the shaft portion 111 is rotatably supported by the radial bearing 150, and the distal end portion 113 at the lower end of the grooved portion 112 is pivotally supported by the support member (pivot support member) 140 through the center hole 121 of the magnetic disk 120. The radial bearing 150 is supported at a predetermined position in the up-down direction by the third yoke 70 and the first yoke 30. An O-ring 116 is fitted to the groove of the grooved portion 112. Thus, the shaft 110 maintains in close contact with the first yoke 30 while being supported rotatably around the central axis 11 relative to the first yoke 30, the second yoke 40, and the third yoke 70. The upper portion of the shaft portion 111 is exposed to the upper side of the third yoke 70, and coupling holes 114, 115 for coupling members required for input operation to the shaft 110 are provided at the exposed portion of the shaft portion 111.

As shown in FIG. 4A to FIG. 6, the magnetic disk 120 is disposed in the clearance 80 between the first yoke 30 and the second yoke 40 so as to extend in the direction perpendicular to the central axis 11. Thus, the magnetic disk 120 is located so as to overlap the exciting coil 50 in the direction along the central axis 11. In this case, the magnetic disk 120 and the exciting coil 50 just need to be located so as to at least partially overlap in the direction along the central axis 11. As shown in FIG. 6, there is a clearance 81 between a top surface 124 of the magnetic disk 120 and the bottom surface 35 of the first yoke 30, and there is a clearance 82 between an under surface 125 of the magnetic disk 120 and the top surface 41 of the second yoke 40. In addition, the outer periphery 126 of the magnetic disk 120 and the side wall portion 75 of the third yoke 70 are spaced apart with the magnetic gap G.

When the shaft 110 is operated to rotate and, as a result, the magnetic disk 120 rotates relative to the first yoke 30 and the second yoke 40, a distance in the up-down direction between the top surface 124 of the magnetic disk 120 and the bottom surface 35 of the first yoke 30 is maintained substantially constant, a distance in the up-down direction between the under surface 125 of the magnetic disk 120 and the top surface 41 of the second yoke 40 is maintained substantially constant, and a distance in the radial direction between the outer periphery 126 of the magnetic disk 120 and the inner periphery 71 of the side wall portion 75 is also substantially constant.

As shown in FIG. 4A to FIG. 6, the clearance 80 around the magnetic disk 120 is filled with the magnetic viscous fluid 160. Therefore, the magnetic viscous fluid 160 is present in the clearance 81 sandwiched in the up-down direction by the top surface 124 of the magnetic disk 120 and the bottom surface 35 of the first yoke 30, and the magnetic viscous fluid 160 is also present in the clearance 82 sandwiched in the up-down direction by the under surface 125 of the magnetic disk 120 and the top surface 41 of the second yoke 40. In addition, the magnetic viscous fluid 160 is also present in a space (magnetic gap G) sandwiched in the radial direction by the outer periphery 126 of the magnetic disk 120 and the side wall portion 75 of the third yoke 70. The clearance 80 around the magnetic disk 120 is sealed by the shaft 110, the O-ring 116, the support member 140, the first yoke 30, the second yoke 40, the third yoke 70, the annular member 60, and the like. Therefore, the magnetic viscous fluid 160 is reliably held in the clearance 80.

The clearance 80 does not need to be fully filled with the magnetic viscous fluid 160. For example, the magnetic viscous fluid 160 may be present in any one of the top surface 124 side and the under surface 125 side. The magnetic viscous fluid 160 may be not only filled into the clearance 80 by being injected into the clearance 80 but also disposed in the clearance 80 by being applied to the top surface 124 and under surface 125 of the magnetic disk 120, the bottom surface 35 of the annular portion 31, the top surface 41 of the second yoke 40, the under surface 61 of the annular member 60, the inner periphery 71 of the third yoke 70, and the like.

The magnetic viscous fluid 160 is a substance that changes its viscosity when applied with a magnetic field and is, for example, a fluid in which particles (magnetic particles) made of a magnetic material are dispersed in nonmagnetic liquid (solvent). Examples of the magnetic particles contained in the magnetic viscous fluid 160 preferably include iron-based particles containing carbon, and ferrite particles. The iron-based particles containing carbon preferably has a carbon content of 0.15% or higher. The diameter of the magnetic particles is preferably, for example, 0.5 μm or greater and more preferably 1 μm or greater. It is desirable that, for the magnetic viscous fluid 160, a solvent and magnetic particles be selected such that the magnetic particles are difficult to sediment under gravity. In addition, it is desirable that the magnetic viscous fluid 160 contain a coupling material that inhibits sedimentation of magnetic particles.

As current is applied to the exciting coil 50, the magnetic field as shown in FIG. 4B as described above is generated, magnetic flux only in the direction along the up-down direction preferably crosses the magnetic disk 120, and no magnetic flux is generated or magnetic flux is generated at a slight magnetic flux density along the radial direction inside the magnetic disk 120. With this magnetic field, magnetic lines of force along the radial direction are generated in the second yoke 40, and magnetic lines of force in the direction along the up-down direction and in the reverse direction from that of the magnetic lines of force in the magnetic disk 120 are generated in the side wall portion 75 of the third yoke 70. In addition, in the top wall portion 74 of the third yoke 70, magnetic lines of force in the direction along the radial direction and in the reverse direction from that of the magnetic lines of force in the second yoke 40 are generated.

In the magnetic viscous fluid 160, when no magnetic field is generated by the exciting coil 50, the magnetic particles are dispersed in the solvent. Therefore, as an operator operates the shaft 110, the holder 20 rotates relative to the operating unit 100 without receiving a large resistance force. Alternatively, when there is residual magnetic flux in the yokes in a state where no current is supplied to the exciting coil 50, a resistance torque remains in the shaft 110 according to the density of the residual magnetic flux.

On the other hand, as a magnetic field is generated by applying current to the exciting coil 50, a magnetic field along the up-down direction is applied to the magnetic viscous fluid 160. With this magnetic field, the magnetic particles dispersed in the magnetic viscous fluid 160 gather along the magnetic lines of force, and the magnetic particles aligned along the up-down direction are magnetically coupled to one another. In this state, as a force to rotate the shaft 110 in a direction around the central axis 11 is applied, an operator can feel a resistance force as compared to a state where no magnetic field is generated because a resistance force (torque) caused by the coupled magnetic particles works.

In the present embodiment, since the magnetic disk 120 that spreads in a disc shape radially outward from the shaft 110 is used, the magnetic viscous fluid 160 can be disposed in a wide range as compared to the case of only the shaft 110. In addition, the magnitude of resistance force of the magnetic viscous fluid 160 correlates with how wide the range is. In the range, the magnetic viscous fluid 160 sandwiched in the up-down direction by the bottom surface 35 of the first yoke 30 or the top surface 41 of the second yoke 40 is disposed. Particularly, the magnitude of resistance force caused by the magnetic viscous fluid 160 at the time when the magnetic disk 120 is rotated by operating the shaft 110 correlates with the area of the magnetic viscous fluid 160 on a plane perpendicular to the rotation direction of the magnetic disk 120. Thus, as the range in which the magnetic viscous fluid 160 is disposed widens, a controlled range of resistance force (torque) can be widened.

Figure 7:
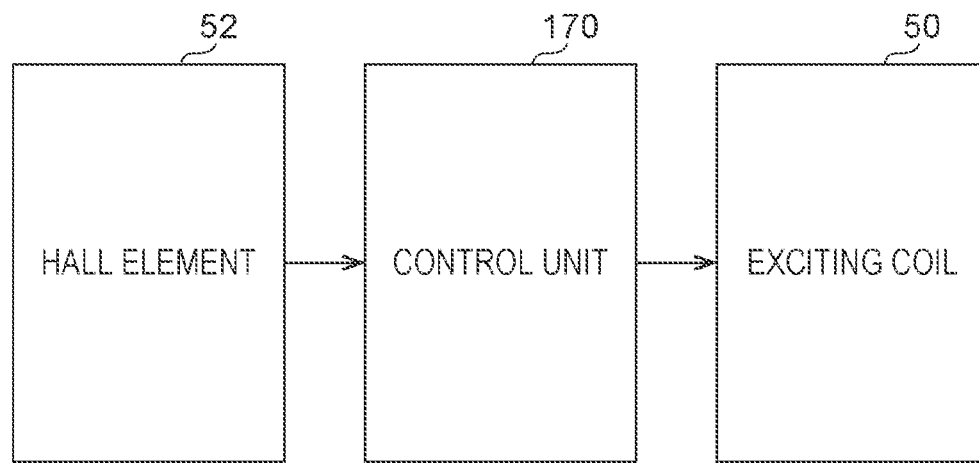
FIG. 7 is a block diagram of a control system of the torque generating device according to the first embodiment.

FIG. 7 is a block diagram of a control system of the torque generating device 10. The torque generating device 10 further includes a control unit 170 in addition to the above-described exciting coil 50 and Hall element 52.

As shown in FIG. 4B, the Hall element 52 that serves as a magnetic measurement portion is disposed in the magnetic path of a magnetic field that is generated by applying current to the exciting coil 50. More specifically, the Hall element 52 is disposed on the upper side of the exciting coil 50 inside the top wall portion 74 of the third yoke 70. The Hall element 52 is disposed at this position by inserting the Hall element 52 into the recess provided in the top wall portion 74 and is fixed by bonding. In this way, preferably, when the Hall element 52 is disposed in the magnetic path of the magnetic field that is generated by the exciting coil 50, magnetism caused by this magnetic field can be accurately measured, and residual magnetism after application of current to the exciting coil 50 is stopped can also be accurately measured.

The Hall element 52 may also be disposed at another position as long as the position is in the magnetic path of the magnetic field that is generated by the exciting coil 50. The magnetic measurement portion is not limited to the Hall element and may be, for example, a magneto-resistive element.

The control unit 170 controls the magnitude of current that is applied to the exciting coil 50 according to the magnitude (magnetic flux density) of magnetism that is measured by the Hall element 52. Thus, the control unit 170 controls a magnetic field that is generated by the exciting coil 50. The control unit 170 includes, for example, a central processing unit and a storage device. The control unit 170 executes control by running a program stored in the storage device on the central processing unit. The relationship between magnetism measured by the Hall element 52 and a current that is applied to the exciting coil 50 may be sequentially calculated by computation or may be designated based on a correspondence table created in advance or may be designated with a method other than these. With such control, magnetism can be set to substantially zero, so an operator can get a stable operational feel.

Alternatively, control may be executed such that residual magnetism becomes substantially a constant value. With this configuration as well, an operator can get a stable operational feel. With this control, when the magnetic flux density of the residual magnetism is maintained at a constant value, for example, 3 mT or higher, it is possible to prevent a situation in which magnetic particles in the magnetic viscous fluid 160 sediment under gravity when current has not been applied to the exciting coil 50 for a long period of time and, as a result, a feel that an operator gets changes.

In addition to the Hall element 52, a detection unit that detects a relative position between the holder 20 and the operating unit 100 with a mechanical method, an electromagnetic method, an optical method, or another method may be provided. The detection unit is, for example, a rotary encoder.

Figure 8A:
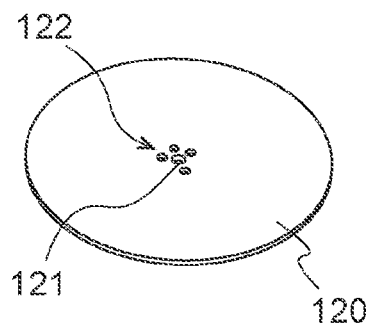
FIG. 8A is a perspective view that shows the configuration of a magnetic disk in the first embodiment.
Figure 8B:
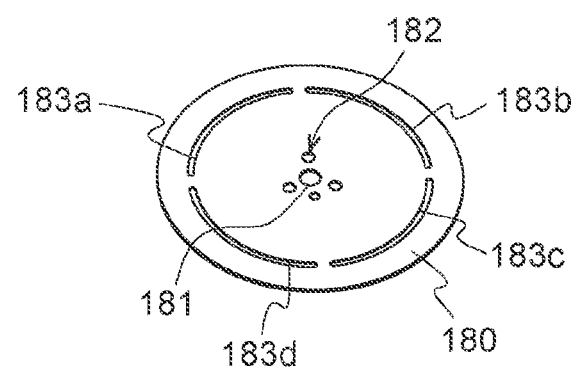
FIG. 8B is a perspective view that shows the configuration of a magnetic disk in a comparative example.

FIG. 8A is a perspective view that shows the configuration of the magnetic disk 120 in the first embodiment, and FIG. 8B is a perspective view that shows the configuration of a magnetic disk 180 in the comparative example. FIG. 9 is a graph that shows the distribution of magnetic flux density in the magnetic disk 120 of the first embodiment shown in FIG. 8A and the distribution of magnetic flux density in the magnetic disk 180 of the comparative example shown in FIG. 8B. In FIG. 9, the distribution of magnetic flux density of the magnetic disk 180 of the comparative example is represented by the solid line L1, and the distribution of magnetic flux density of the magnetic disk 120 of the first embodiment is represented by the dashed line L2. In the range P1, two lines L1, L2 overlap each other.

The magnetic disk 180 in the comparative example, as well as the magnetic disk 120 in the first embodiment, is made of a magnetic material and has a circular plane disposed perpendicularly to the up-down direction. A center hole 181 extending through in the up-down direction is provided at the center of the circular plane. A plurality of through-holes 182 extending through from the upper side to the lower side is provided at a position surrounding the center hole 121. The magnetic disk 180, as well as the magnetic disk 120 in the first embodiment, is fixed to the shaft 110 by fitting the shaft portion of each screw 91, inserted in the through-hole 182, into the grooved portion 112 of the shaft 110.

The magnetic disk 180 in the comparative example further includes four slits 183a, 183b, 183c, 183d extending through in the up-down direction (thickness direction). These slits are provided at the same distance from the center of the circular plane at equal angular intervals along a circumferential direction. In the comparative example, as the magnetic field shown in FIG. 4B is generated by the exciting coil 50, the four slits 183a, 183b, 183c, 183d function as magnetic gaps. Therefore, magnetic flux crosses downward from the first yoke 30 toward the second yoke 40 on the central axis 11 side (inner side) of the four slits 183a, 183b, 183c, 183d, and magnetic flux crosses upward from the second yoke 40 toward the first yoke 30 on the outer side of the four slits 183a, 183b, 183c, 183d.

The abscissa axis of FIG. 9 represents a distance (in mm) from the center of the circular plane of the magnetic disk 180, and the ordinate axis represents a magnetic flux density (in mT) at each position. As shown in FIG. 9, a magnetic flux density is small near the center where the center hole 121 and the through-holes 182 are provided, that is, the range P1 of which the distance is shorter than 4 mm; whereas a magnetic flux density greater than or equal to a set value is found in a range P2 of which the distance is longer than or equal to 4 mm.

In FIG. 9, a range S of about 9 mm to 9.5 mm corresponds to a range in which the slits 183a, 183b, 183c, 183d are provided. As shown in FIG. 9, in this range S, passage of magnetic flux of a magnetic field that is generated by the exciting coil 50 is restricted, so the magnetic flux density significantly decreases. In addition, in a peripheral range of a range P3 from the range S toward the center by about 2 mm and a range P4 from the range S toward the outer periphery by about 2 mm as well, a decrease in magnetic flux density is found.

Furthermore, in a range P5 on the outer side of the peripheral range P4, an increase in magnetic flux density with respect to the range P2 is found. This is because magnetic flux that has passed through the center-side range P2 crosses upward in the range P5 narrower than the range P2.

In contrast to this, preferably, the magnetic disk 120 of the first embodiment has no slit (magnetic gap) that restricts passage of magnetic flux of a magnetic field that is generated by the exciting coil 50, and magnetic flux passes downward from the first yoke 30 toward the second yoke 40 uniformly in all the region of the magnetic disk 120 in the radial direction. For this reason, as represented by the dashed line L2 in FIG. 9, a substantially constant magnetic flux density can be obtained in a wide range on the outer side of a range near the center. In other words, a magnetic flux density does not decrease in the range S, corresponding to the slits, and the ranges P3, P4 around the range S unlike the magnetic disk 180 of the comparative example, and a magnetic flux density does not increase in the outermost range P5.

As compared to the magnetic disk 180 of the comparative example, no slit is provided in the magnetic disk 120 of the first embodiment, and a magnetic field in the same direction along the up-down direction is applied, so control over resistance force is easy. Since a magnetic field in the same direction is applied to the magnetic disk 120, so a sufficient resistance force can be applied with a small radius.

Hereinafter, a modification will be described.

In the first embodiment, the three separate yokes 30, 40, 70 are provided in combination. Alternatively, two or three yokes of the three yokes may be integrally provided. In the case of this configuration as well, two yokes are disposed on both sides across the magnetic disk 120, and a third yoke is disposed so as to provide a magnetic path on the outer side of the exciting coil 50.

The magnetic gap G is provided between the first yoke 30 and the third yoke 70 so as to space the first yoke 30 and the third yoke 70 apart from each other in the radial direction. In the first embodiment, the magnetic gap G is formed at a position that overlaps the outer periphery 126 that is the outer peripheral edge of the magnetic disk 120. In other words, in the direction perpendicular to the central axis 11, the outer periphery 126 of the magnetic disk 120 is located at a position that substantially matches the outer periphery 31a of the annular portion 31 forming one surface of the magnetic gap G. In contrast to this, the outer periphery 126 of the magnetic disk 120 may be located closer to the central axis 11 than the outer periphery 31a of the annular portion 31. In other words, the magnetic gap G may be located on the outer side of the outer peripheral edge of the magnetic disk 120.

Figure 10A:
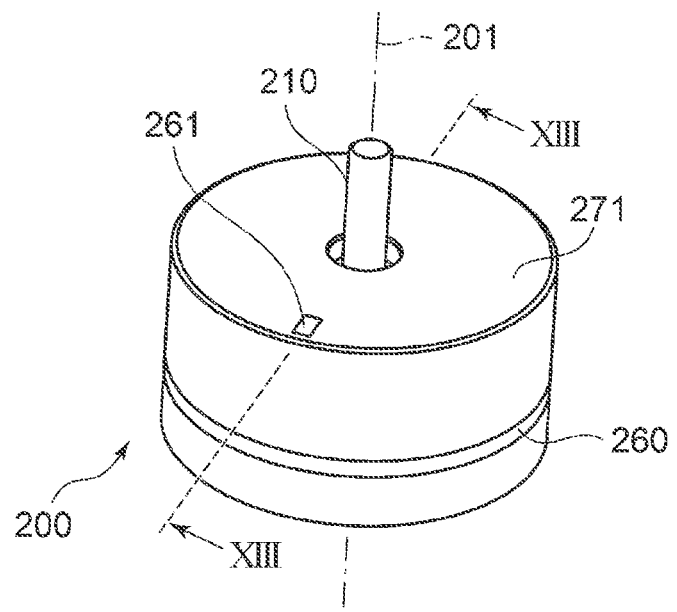
FIG. 10A is a perspective view when the schematic configuration of a torque generating device according to a second embodiment is viewed from a top side.
Figure 10B:
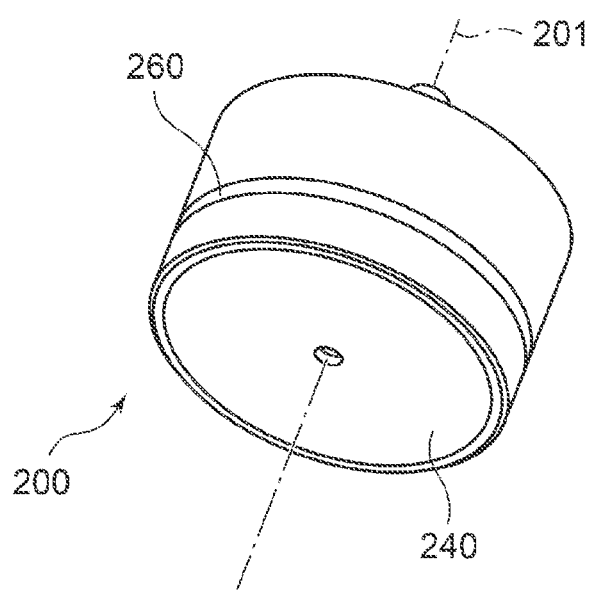
FIG. 10B is a perspective view when the torque generating device of FIG. 10A is viewed from a bottom side.
Figure 11:
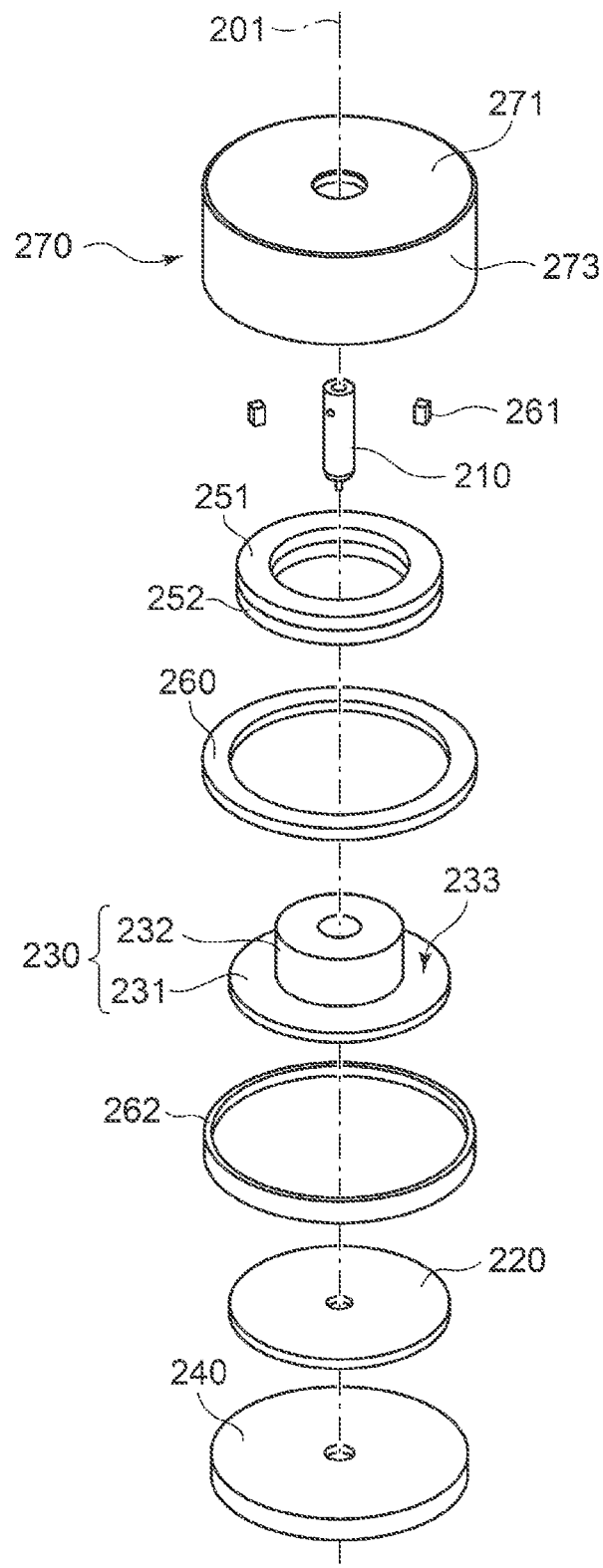
FIG. 11 is an exploded perspective view when the schematic configuration of the torque generating device according to the second embodiment is viewed from the top side.
Figure 12:
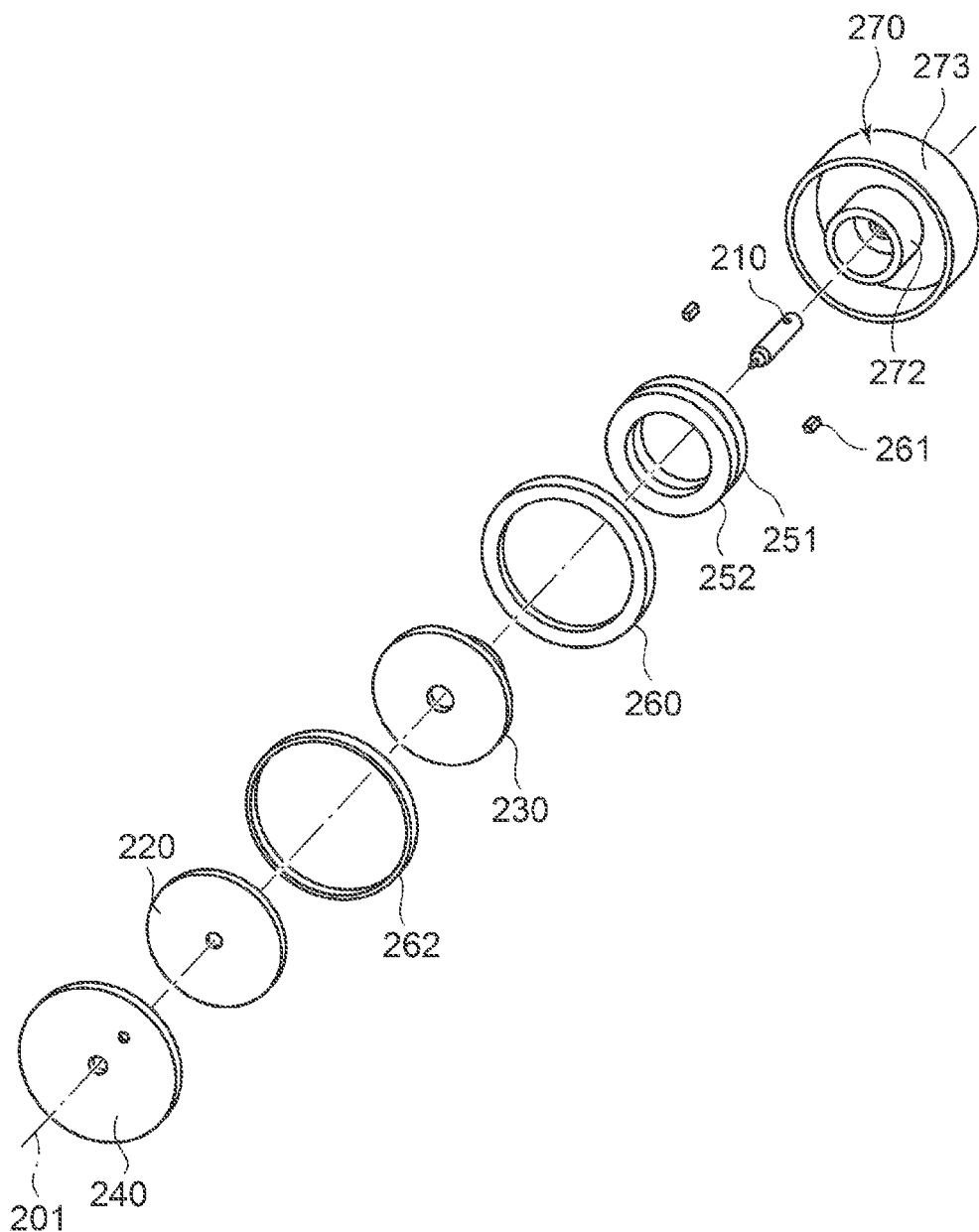
FIG. 12 is an exploded perspective view when the schematic configuration of the torque generating device according to the second embodiment is viewed from the bottom side.
Figure 13:
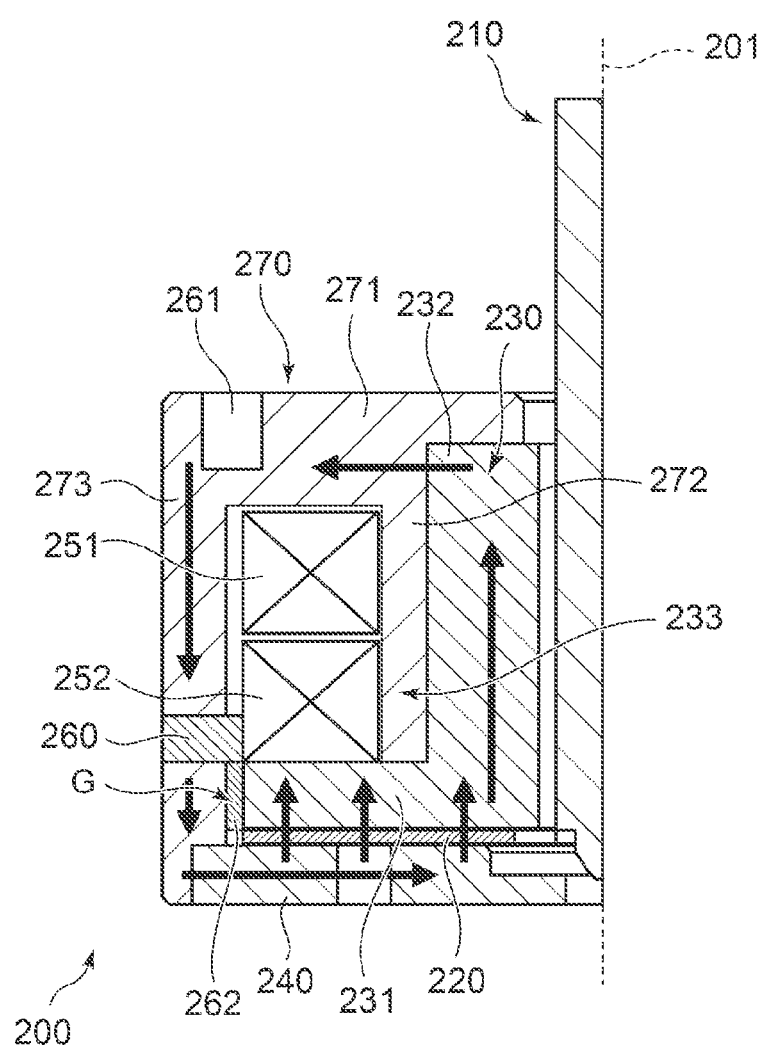
FIG. 13 is a cross-sectional view that shows the schematic configuration of the torque generating device according to the second embodiment and is a cross-sectional view taken along the line XIII-XIII in FIG. 10.

FIG. 10A is a perspective view when the schematic configuration of a torque generating device 200 according to a second embodiment is viewed from a top side, and FIG. 10B is a perspective view when viewed from a bottom side. FIG. 11 is an exploded perspective view when the schematic configuration of the torque generating device 200 is viewed from the top side. FIG. 12 is an exploded perspective view when the schematic configuration of the torque generating device 200 is viewed from the bottom side. FIG. 13 is a cross-sectional view that shows the schematic configuration of the torque generating device 200 according to the second embodiment. FIG. 13 is a cross-sectional view corresponding to FIG. 4A and FIG. 4B and does not show the right side because the configuration is bilaterally symmetric. FIG. 13 also shows the schematic configuration by omitting details, such as bearings and screws. The torque generating device 200 of the second embodiment differs from the torque generating device 10 of the first embodiment in that a permanent magnet 260 is disposed halfway in a third yoke 270 in a magnetic path of magnetic fields that are generated by exciting coils 251, 252.

The torque generating device 200 shown in FIG. 10 to FIG. 13 includes a shaft 210, a magnetic disk 220, a first yoke 230, a second yoke 240, the two exciting coils 251, 252, the permanent magnet 260, a Hall element 261 that serves as a magnetic measurement portion, an annular member 262, and the third yoke 270. The magnetic disk 220, as in the case of the first embodiment, is disposed rotatably around a central axis 201 in a clearance between the first yoke 230 and the second yoke 240, filled with a magnetic viscous fluid. Where the shaft 210 and the magnetic disk 220 serve as an operating unit and the first yoke 230, the second yoke 240, the two exciting coils 251, 252, the permanent magnet 260, and the third yoke 270 serve as a holder, the operating unit is supported by the holder so as to rotate in both directions around the central axis 201 as in the case of the first embodiment.

In FIG. 13, magnetic fields that are generated by the two exciting coils 251, 252 are represented by the arrows. This magnetic fields are the ones when currents in a reverse direction from that of the example shown in FIG. 4B are applied to the two exciting coils 251, 252, and magnetic fields in a reverse direction from the direction shown in FIG. 4B are generated. Magnetic fields in the same direction as the direction shown in FIG. 4B can be obtained by passing current in the same direction as that in the example shown in FIG. 4B. The configuration and support configuration of the shaft 210 are similar to those of the shaft 110 of the first embodiment, and the configuration and support configuration of the magnetic disk 220 are also similar to those of the magnetic disk 120 of the first embodiment, so the detailed description of these is omitted.

The first yoke 230 and the second yoke 240, as well as the first yoke 30 and the second yoke 40 of the first embodiment, are respectively disposed on the upper side and lower side across the magnetic disk 220. The first yoke 230, as well as the first yoke 30 of the first embodiment, includes an annular portion 231 and a cylindrical portion 232 integrally provided so as to extend upward from the top surface of the annular portion 231 concentrically with the annular portion 231. The annular portion 231 and the cylindrical portion 232 each have a circular shape about the central axis 201 in plan view. The outside diameter of the cylindrical portion 232 is less than the outside diameter of the annular portion 231. Because of the difference in outside diameter between the annular portion 231 and the cylindrical portion 232, a step portion 233 is formed on the outer side of the cylindrical portion 232.

The two exciting coils 251, 252 that serve as a magnetic field generating portion are disposed at the step portion 233 of the first yoke 230. These exciting coils 251, 252 have the same shape, the inner periphery of each of the exciting coils 251, 252 has an annular shape that is formed along the outer periphery of the cylindrical portion 232 of the first yoke 230, and the outer periphery of each of the exciting coils 251, 252 is disposed at substantially the same position as the annular portion 231 in the radial direction. The exciting coils 251, 252 each are a coil including a conductor wound around the central axis 201. As well as the exciting coil 50 of the first embodiment, current is supplied to each of the exciting coils 251, 252, with the result that magnetic fields are generated. These exciting coils 251, 252 are disposed on top of each other so as to generate magnetic fields having the same direction. When magnetic fields to be generated are intended to be reduced, control may be executed so as to supply current to only one of the exciting coils 251, 252. Instead of disposing the two exciting coils 251, 252, a single coil may be disposed as in the case of the exciting coil 50 of the first embodiment.

In the second embodiment as well, the annular member 262 of a material and shape similar to those of the annular member 60 of the first embodiment is provided. The annular member 262 is fixed along the outer periphery of the annular portion 231 of the first yoke 230, and has a circular shape in plan view, having a greater outside diameter than the exciting coils 251, 252 disposed at the step portion 233. As shown in FIG. 13, the under surface of the annular member 262 forms substantially the same plane with the bottom surface of the first yoke 230, and this plane extends along a direction perpendicular to the central axis 201. The thickness of the annular member 262 in the radial direction is such a thickness that the magnetic fields generated by the exciting coils 251, 252 can be prevented from penetrating through the annular member 262 in the radial direction.

As shown in FIG. 10A and FIG. 10B, the third yoke 270 has a cylindrical outer shape.

As shown in FIG. 13, the third yoke 270 includes a top wall portion 271 that covers the top sides of the two exciting coils 251, 252, an inner wall portion 272 extending downward from the top wall portion 271 on the inner side of the exciting coils 251, 252, and an outer wall portion 273 extending downward from the top wall portion 271 on the outer side of the exciting coils 251, 252. As shown in FIG. 11, the inner wall portion 272 and the outer wall portion 273 are disposed concentrically about the central axis 201.

The third yoke 270 is fixed in a state where the top wall portion 271 and inner wall portion 272 of the third yoke 270 are in contact with the cylindrical portion 232 of the first yoke 230. Thus, the first yoke 230 and the third yoke 270 are magnetically connected. The outer wall portion 273 of the third yoke 270 has a circular shape when viewed along a direction parallel to the central axis 201, and the lower portion of the outer wall portion 273 is fixedly in contact with the second yoke 240. Thus, the second yoke 240 and the third yoke 270 are magnetically connected. Thus, a magnetic path of magnetic fields as represented by the arrows in FIG. 13 is formed. In other words, magnetic flux crosses the magnetic disk 220 from the second yoke 240 toward the first yoke 230 along the direction of the central axis 201, and the magnetic flux travels upward along the central axis 201 in the first yoke 230 and reaches the third yoke 270. In the top wall portion 271 of the third yoke 270, the magnetic flux travels in a direction away from the central axis 201 to reach the outer wall portion 273, and, in the outer wall portion 273, travels downward along the central axis 201 and reaches the second yoke 240. In the second yoke 240, the magnetic flux travels in a direction to approach the central axis 201, crosses again through the magnetic disk 220, and reaches the first yoke 230.

The permanent magnet 260 is disposed in the outer wall portion 273 of the third yoke 270 in the magnetic path of the magnetic fields that are generated by the two exciting coils 251, 252. The permanent magnet 260 is disposed at a position facing the lower-side exciting coil 252, and magnetic poles are disposed so as to generate a magnetic field in a direction along the direction of the magnetic fields that are generated by the two exciting coils 251, 252. The permanent magnet 260 is in contact with and supported by the annular member 262. A permanent magnet may be provided at a position other than the position shown in FIG. 13 or the number of permanent magnets may be two or more as long as the permanent magnet(s) is/are able to generate a magnetic field(s) in a direction along the direction of the magnetic fields that are generated by the two exciting coils 251, 252. The permanent magnet 260 is not limited to such a disposition to provide the same direction as the direction of the magnetic fields that are generated by the two exciting coils 251, 252. Alternatively, magnetic poles of the permanent magnet 260 may be disposed so as to impart a magnetic field in a reverse direction from the direction of the magnetic fields that are generated by the two exciting coils 251, 252.

Since the clearance around the magnetic disk 220 is sealed by the shaft 210, the first yoke 230, the second yoke 240, the third yoke 270, the annular member 262, and the like, a magnetic viscous fluid that fills the clearance is reliably separated from the permanent magnet 260.

With the permanent magnet 260, preferably, an initial magnetic field can be generated even in a state where no current is applied to the two exciting coils 251, 252. Therefore, residual magnetism including an initial magnetic field caused by the permanent magnet 260 can be imparted to a magnetic viscous fluid, so a resistance force (torque) can be applied against a force to rotate the shaft 210. By applying residual magnetism including an initial magnetic field caused by the permanent magnet 260, sedimentation of magnetic particles inside the magnetic viscous fluid can be prevented, and, after that, rising of resistance torque at the time of passage of current to the exciting coils 251, 252 can be quickened. Conversely to the above configuration, when the magnetic poles of the permanent magnet 260 are disposed so as to impart an initial magnetic field in a reverse direction from the direction of the magnetic fields that are generated by the two exciting coils 251, 252, magnetic flux that crosses the magnetic disk 220 can be brought close to zero by controlling current to the two exciting coils 251, 252, so the operational resistance of the shaft 210 can be controlled to zero. In contrast to this, in the configuration in which the permanent magnet is added in the comparative example shown in FIG. 8B, a magnetic field on the inner side of the slits 183a, 183b, 183c, 183d and a magnetic field on the outer side of the slits 183a, 183b, 183c, 183d are in reverse directions, and magnetic flux densities are different, so it is difficult to bring residual magnetism to zero, and it is difficult to control an operational resistance to zero.

With the permanent magnet 260, residual magnetism including an initial magnetic field can be imparted to a magnetic viscous fluid in a state where no current is applied to the two exciting coils 251, 252, so sedimentation of magnetic particles in the magnetic viscous fluid under gravity can be prevented, and a desired dispersion state can be maintained. Thus, regardless of whether a duration during which no current is applied to the two exciting coils 251, 252 is long or short, a resistance that an operator receives can be controlled to a predetermined range.

The Hall element 261 that serves as a magnetic measurement portion is disposed in the magnetic path of the magnetic fields that are generated by applying current to the exciting coils 251, 252. More specifically, the Hall element 261 is disposed on the upper side of the exciting coils 251, 252 inside the top wall portion 271 of the third yoke 270. The Hall element 261 is disposed at this position by inserting the Hall element 261 into the recess provided in the top wall portion 271 and is fixed by bonding. In this way, when the Hall element 261 is disposed in the magnetic path of the magnetic fields that are generated by the exciting coils 251, 252, magnetism caused by this magnetic fields can be accurately measured, and residual magnetism after application of current to the exciting coils 251, 252 is stopped can also be accurately measured. Since the Hall element 261 is disposed at a position remote from the exciting coils 251, 252 that generate magnetic fields, the two yokes 230, 240, and the magnetic disk 220, a magnetic field in the clearance in which the magnetic disk 220 is disposed can be stabilized.

The other configuration, operation, and advantageous effects are similar to those of the first embodiment.

The present invention is described with reference to the above-described embodiments; however, the present invention is not limited to the above-described embodiments. Improvements or modifications are applicable within the range of the purpose of improvement or the idea of the present invention.

As described above, the torque generating device according to the present invention is useful in that miniaturization is easy and large shear stress can be obtained.

What is claimed is:

1. A torque generating device comprising:
a magnetic disk configured to have rotational motion around a rotation axis;
a first yoke located on one side and a second yoke located on an other side across the magnetic disk;
a coil disposed so as to overlap the magnetic disk when viewed in a direction along a direction in which the rotation axis extends;
a third yoke of which at least a region proximity to the magnetic disk is located on an outer side of the magnetic disk and the coil and that makes up a magnetic path of a magnetic field that is generated by the coil in cooperation with the first yoke and the second yoke; and a magnetic viscous fluid filled between the magnetic disk and each of the first yoke and the second yoke, wherein:

the third yoke has substantially an outer quadrangular shape in plan view and a circular space in plan view on an interior of the third yoke such that the third yoke has a side wall portion having side walls between four corners, wherein the wall portion is thicker at the corners than at the side walls, the third yoke has a magnetic gap between the third yoke and the first yoke, and the magnetic gap is at a position on an outer side of an outer peripheral edge of the magnetic disk or a position that overlaps the outer peripheral edge of the magnetic disk when viewed in the direction along the direction in which the rotation axis extends.

2. The torque generating device according to claim 1, wherein only magnetic flux crossing between the first yoke and the second yoke passes through the magnetic disk.

3. The torque generating device according to claim 2, wherein no magnetic gap is provided in a region that the magnetic flux crosses in the magnetic disk.

4. The torque generating device according to claim 1, wherein, in a plane perpendicular to the rotation axis, a distance between the outer peripheral edge of the magnetic disk and an outer side surface of the third yoke is not uniform.

5. The torque generating device according to claim 1, further comprising a permanent magnet provided in a magnetic path of a magnetic field that is generated by the coil, the permanent magnet applying an initial magnetic field in the same direction as or in an opposite direction from a direction of the magnetic field generated by the coil.

6. The torque generating device according to claim 1, wherein the first yoke, the second yoke, and the third yoke are separate pieces.

7. The torque generating device according to claim 1, further comprising a magnetic measurement sensor configured to measure magnetism caused by a magnetic field that is generated by the coil.

8. A torque generating device comprising:

a magnetic disk configured to have rotational motion around a rotation axis;

a first yoke located on one side and a second yoke located on an other side across the magnetic disk, the first yoke having an annular portion and a cylindrical portion that extends concentrically from the annular portion, the annular portion having an outer periphery on an annular portion outside diameter, the cylindrical portion having an outer periphery on a cylindrical portion outside diameter, the cylindrical portion outside diameter being less than annular portion outside diameter to define a step portion on the outer periphery of the cylindrical portion, an annular coil having an inner periphery and an outer periphery on an annular coil outside diameter, the annular coil outer diameter being greater than the annular portion outer diameter, the annular coil disposed in the step portion such that the inner periphery of the annular coil is disposed along the outer periphery of the cylindrical portion and such that the annular coil overlaps the magnetic disk when viewed in a direction along a direction in which the rotation axis extends;

a third yoke of which at least a region proximity to the magnetic disk is located on an outer side of the magnetic disk and the coil and that makes up a magnetic path of a magnetic field that is generated by the coil in cooperation with the first yoke and the second yoke; and a magnetic viscous fluid filled between the magnetic disk and each of the first yoke and the second yoke, wherein:

the third yoke has a magnetic gap between the third yoke and the first yoke, and the magnetic gap is at a position on an outer side of an outer peripheral edge of the magnetic disk or a position that overlaps the outer peripheral edge of the magnetic disk when viewed in the direction along the direction in which the rotation axis extends.

9. The torque generating device according to claim 8, wherein only magnetic flux crossing between the first yoke and the second yoke passes through the magnetic disk.

10. The torque generating device according to claim 9, wherein no magnetic gap is provided in a region that the magnetic flux crosses in the magnetic disk.

11. The torque generating device according to claim 8, wherein, in a plane perpendicular to the rotation axis, a distance between the outer peripheral edge of the magnetic disk and an outer side surface of the third yoke is not uniform.

12. The torque generating device according to claim 11, wherein the third yoke has substantially a quadrangular shape in plan view.

13. The torque generating device according to claim 8, further comprising a permanent magnet provided in a magnetic path of a magnetic field that is generated by the coil, the permanent magnet applying an initial magnetic field in the same direction as or in an opposite direction from a direction of the magnetic field generated by the coil.

14. The torque generating device according to claim 8, wherein the first yoke, the second yoke, and the third yoke are separate pieces.

15. The torque generating device according to claim 8, further comprising a magnetic measurement sensor configured to measure magnetism caused by a magnetic field that is generated by the coil.

* * * * *